US009063816B2

(12) United States Patent
Hobbet et al.

(10) Patent No.: US 9,063,816 B2
(45) Date of Patent: Jun. 23, 2015

(54) METHOD AND APPARATUS FOR UPDATING FIRMWARE ON A STORAGE DEVICE

(75) Inventors: Jeffrey R. Hobbet, Holly Springs, NC (US); Randall Scott Springfield, Chapel Hill, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 1116 days.

(21) Appl. No.: 12/701,148

(22) Filed: Feb. 5, 2010

(65) Prior Publication Data

US 2011/0197185 A1 Aug. 11, 2011

(51) Int. Cl.
*G06F 9/44* (2006.01)
*G06F 9/445* (2006.01)
*G06F 11/14* (2006.01)

(52) U.S. Cl.
CPC .............. *G06F 8/65* (2013.01); *G06F 11/1433* (2013.01)

(58) Field of Classification Search
CPC ......... G06F 8/65; G06F 8/665; G06F 21/572; G06F 11/1417; G06F 8/60; G06F 8/61; G06F 3/123; G06F 11/0727
See application file for complete search history.

(56) References Cited

U.S. PATENT DOCUMENTS

| | | | |
|---|---|---|---|
| 7,197,634 B2 * | 3/2007 | Kruger et al. | 713/1 |
| 7,228,538 B1 * | 6/2007 | Burton et al. | 717/170 |
| 8,527,981 B2 * | 9/2013 | Oikawa et al. | 717/173 |
| 2002/0178352 A1 * | 11/2002 | Lambino et al. | 713/2 |
| 2002/0194582 A1 * | 12/2002 | Torii et al. | 717/171 |
| 2003/0154471 A1 * | 8/2003 | Teachman et al. | 717/171 |
| 2004/0015941 A1 * | 1/2004 | Sekine | 717/168 |
| 2004/0148596 A1 * | 7/2004 | Watson et al. | 717/168 |
| 2005/0155029 A1 * | 7/2005 | Nguyen et al. | 717/168 |
| 2005/0160257 A1 * | 7/2005 | Kruger et al. | 713/2 |
| 2009/0094414 A1 * | 4/2009 | Hsu et al. | 711/112 |
| 2012/0124567 A1 * | 5/2012 | Landry | 717/168 |

OTHER PUBLICATIONS

Dennis K. Nilsson et al.; Secure Firmware Updates over the Air in Intelligent Vehicles; 2008 IEEE; pp. 380-384; <http://ieeexplore.ieee.org/stamp/stamp.jsp?tp=&arnumber=4531926>.*
Katsuhiro Mayama et al.; Design of Firmware Update System of RT-Middleware for Embedded System; 2010 SICE; pp. 2818-2822; <http://ieeexplore.ieee.org/stamp/stamp.jsp?tp=&arnumber=5602590>.*
S. M. Brecher; Microprocessor Firmware Update Inventory Model; 1981 ATT; pp. 2293-2306; <http://ieeexplore.ieee.org/stamp/stamp.jsp?tp=&arnumber=6772263>.*
Syed Riffat ALi; Implementation of Firmware on SPC Switching Systems; 1988 IEEE; pp. 1401-1404; <http://ieeexplore.ieee.org/stamp/stamp.jsp?tp=&arnumber=7874>.*

(Continued)

*Primary Examiner* — Thuy Dao
*Assistant Examiner* — Cuong V Luu
(74) *Attorney, Agent, or Firm* — Kunzler Law Group (57) ABSTRACT

A method, apparatus, and system are disclosed for updating firmware on a storage device. The apparatus includes a detection module and an update module. The detection module detects, during a boot sequence, an indicator of an available update of firmware controlling a storage device. The available update is stored on non-volatile storage media of the storage device. The update module updates the storage device with the available update in response to the detection module detecting the indicator of the available update.

7 Claims, 9 Drawing Sheets

(56) References Cited

OTHER PUBLICATIONS

Xiao He et al.; Research on Security of Hard Disk Firmware; 2011 IEEE; pp. 690-693; <http://ieeexplore.ieee.org/stamp/stamp.jsp?tp=&arnumber=6182060>.*

D. Makowski et al.; Firmware Upgrade in xTCA Systems ; 2012 IEEE; 8 pages; <http://ieeexplore.ieee.org/stamp/stamp.jsp?tp=&arnumber=6418386>.*

* cited by examiner

METHOD AND APPARATUS FOR UPDATING FIRMWARE ON A STORAGE DEVICE

BACKGROUND

1. Field

The subject matter disclosed herein relates to a updating firmware and more particularly relates to updating firmware on a storage device.

2. Description of the Related Art

Storage devices typically include firmware, or embedded code that enables operation of the storage device. In certain storage devices, a user has the ability to update the firmware to add features or correct bugs. A user can typically update firmware by downloading the update from physical media such as a bootable compact disk. The user can boot from the compact disk and run the update utility. However, this method becomes cumbersome for updates on many storage devices.

A user can also typically perform an update by downloading update files across a network. However, as the size of these files increases, transmission of the update files across the network becomes difficult and resource intensive.

SUMMARY

From the foregoing discussion, there is a need for a method and apparatus that provides a storage device firmware update. Beneficially, such a method, apparatus, and system would improve storage device firmware updates.

The embodiments of the present invention have been developed in response to the present state of the art, and in particular, in response to the problems and needs in the art that have not yet been fully solved by currently available storage devices. Accordingly, the embodiments have been developed to provide a method, apparatus, and system for updating firmware on a storage device that overcome many or all of the above-discussed shortcomings in the art.

The apparatus for delayed storage device firmware update is provided with a plurality of modules. The modules include a detection module and an update module. The detection module detects, during a boot sequence, an indicator of an available update of firmware controlling a storage device. The available update is stored on non-volatile storage media of the storage device. The update module updates the storage device with the available update in response to the detection module detecting the indicator of the available update.

In one embodiment, the apparatus includes a storage module that stores the available update in one or more device vendor logs on the non-volatile storage media. In a further embodiment, the apparatus includes an indicator storage module that stores the indicator in the one or more device vendor logs. In one embodiment, the update module further includes a vendor log boot module that boots the storage device from data in the available update and an installation module that installs the available update on the storage device from the device vendor logs.

In one embodiment, the apparatus includes a utility update module that issues a command to the storage device to store the available update on the non-volatile storage media. In certain embodiments, the apparatus includes a device storage module that stores the available update on the non-volatile storage media in response to the command. In one embodiment, the apparatus includes a device indicator storage module that stores the indicator in device identification information maintained by the storage device.

In one embodiment, the detection module detects that the indicator is stored in the device identification information. In certain embodiments, the update module includes a command module that issues an update command to the storage device. In a further embodiment, the apparatus includes an update execution module that executes the available update on the storage device in response to the update command.

A method is presented for delayed storage device firmware update. In one embodiment, the method includes the steps to carry out the functions of the apparatus.

A computer program product is also presented for delayed storage device firmware update with similar steps as the method described above.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
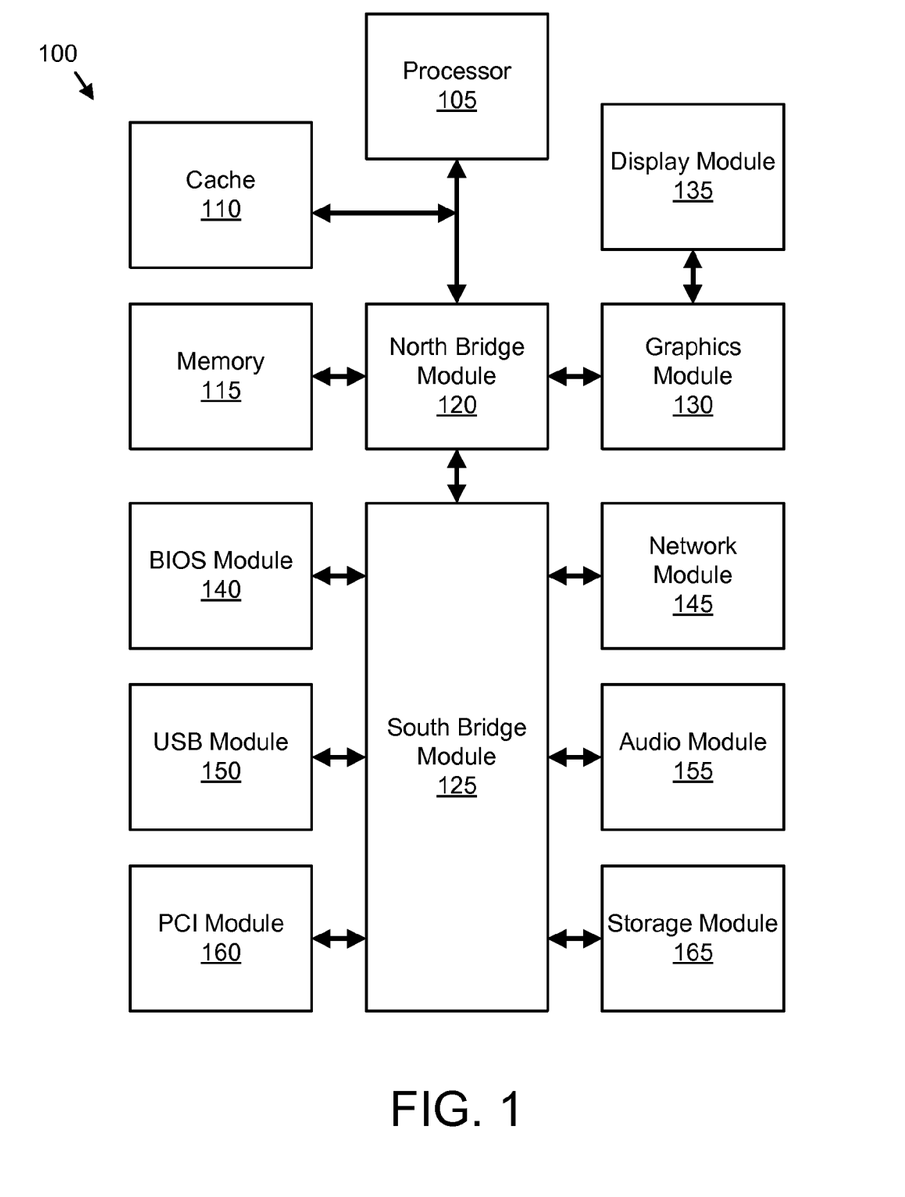
FIG. 1 is a schematic block diagram illustrating one embodiment of a computer system.

FIG. 1 is a schematic block diagram illustrating one embodiment of a computer system 100. The computer system 100 includes a processor 105, a cache 110, a memory 115, a north bridge module 120, a south bridge module 125, a graphics module 130, a display module 135, a basic input/output system (BIOS) module 140, a network module 145, a universal serial bus (USB) module 150, an audio module 155, a peripheral component interconnect (PCI) module 160, and a storage module 165. One of skill in the art will recognize that other configurations of a computer system 100 or multiple computer systems 100 may be employed with the embodiments described herein.

The processor 105, cache 110, memory 115, north bridge module 120, south bridge module 125, graphics module 130, display module 135, BIOS module 140, network module 145, USB module 150, audio module 155, PCI module 160, and storage module 165, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 115 stores computer readable programs. The processor 105 executes the computer readable programs as is well known to those skilled in the art. The computer readable programs may be tangibly stored in the storage module 165. The storage module 165 may comprise at least one SSD. In addition, the storage module 165 may include a hard disk drive, an optical storage device, a holographic storage device, a micromechanical storage device, or the like.

The processor 105 may communicate with the cache 110 through a processor interface bus to reduce the average time to access memory 115. The cache 110 may store copies of instructions and data from the most frequently used memory 115 locations. The computer system 100 may use one or more caches 110 such as a Double Data Rate 2 (DDR2) cache memory or the like.

The north bridge module 120 may communicate with and provide bridging functionality between the processor 105, the graphic module 130, the memory 115, and the cache 110. The processor 105 may be connected to the north bridge module 120 over a, for example, 667 Megahertz (MHz) front side bus.

The north bridge module 120 may be connected to the south bridge module 125 through a direct media interface (DMI) bus. The DMI bus may provide a high-speed, bi-directional, point-to-point link supporting a clock rate for example of one Gigabytes per second (1 GBps) in each direction between the north bridge module 120 and the south bridge module 125. The south bridge module 125 may support and communicate with the BIOS module 140, the network module 145, the PCI module 160, and the storage module 165.

The PCI module 160 may communicate with the south bridge module 125 for transferring data or power to peripheral devices. The PCI module 160 may include a PCI bus for attaching the peripheral devices. The PCI bus can logically connect several peripheral devices over the same set of connections. The peripherals may be selected from a printer, a joystick, a scanner, or the like. The PCI module 160 may also comprise an expansion card as is well known to those skilled in the art.

The BIOS module 140 may communicate instructions through the south bridge module 125 to boot the computer system 100, so that computer readable software instructions stored on the storage module 165 can load, execute, and assume control of the computer system 100. Alternatively, the BIOS module 140 may comprise a coded program embedded on a chipset that recognizes and controls various devices that make up the computer system 100.

The network module 145 may communicate with the south bridge module 125 to allow the computer system 100 to communicate with other devices over a network. The devices may include routers, bridges, computers, printers, and the like.

The display module 135 may communicate with the graphic module 130 to display information as will be described hereafter. The display module 135 may be a cathode ray tube (CRT), a liquid crystal display (LCD) monitor, or the like.

The USB module 150 may communicate with one or more USB compatible devices over a USB bus. The audio module 155 may generate an audio output.

In one embodiment, each module comprises a computer readable storage medium comprising a computer readable program stored on a tangible storage device.

Figure 2:
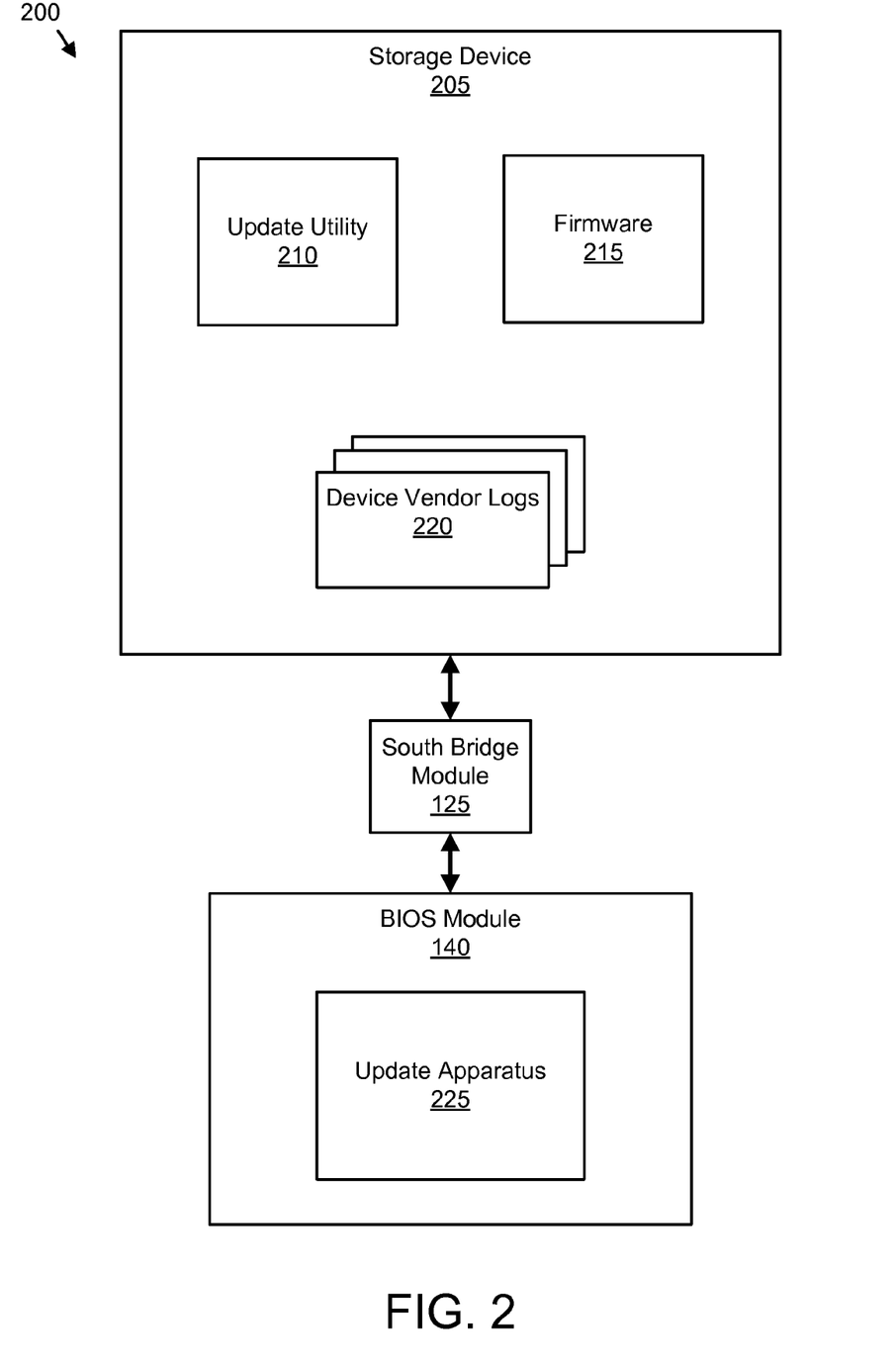
FIG. 2 is a schematic block diagram illustrating one embodiment of a system for updating firmware on a storage device.

FIG. 2 is a schematic block diagram illustrating one embodiment of a system 200 for updating firmware on a storage device. The system 200 includes a BIOS module 140, a south bridge module 125, and a storage device 205. The BIOS module 140 and the south bridge module 125 may be similar to the BIOS module 140 and the south bridge module 125 of FIG. 1. Furthermore, the storage device 205 may be the storage module 165 of FIG. 1. The BIOS module 140 includes an update apparatus 225 and the storage device 205 includes an update utility 210, firmware 215, and device vendor logs 220.

The storage device 205 includes non-volatile storage media and may be a hard disk drive, an optical storage device, a holographic storage device, a micromechanical storage device, a solid-state storage device, and the like. In one embodiment, the storage device 205 is a primary storage device of the computer system 100. As used herein, a primary storage device stores programs, applications, and/or code to operate the computer system 100. For example, a hard drive storing code for the operating system of a computer system 100 may be a primary storage device. The primary storage device may also actively serve I/O requests during operation of the computing system 100.

In one embodiment, the update utility 210, device vendor logs 220, and firmware 215 are stored on non-volatile storage media of the storage device 205. However, the firmware may be stored in a location separate from the update utility 210 and the device vendor logs 220. The update utility 210, while depicted as residing in the storage device 205, may also reside on another storage device as part of, or in communication with, the computing system 100 and/or storage device 205.

The firmware 215 comprises embedded code with various components that enable operation of the storage device 205. The firmware 215 may enable basic operation of the storage device 205 and also implement higher-level functions. The firmware 215 may also be referred to as microcode.

The device vendor logs 220 are a portion of the non-volatile storage that resides on the storage device 205 and are separate from the non-volatile storage to which applications, utilities and programs store and access data with standard storage operations. The device vendor logs 220 may reside outside of the Logical Block Address range available to store program and user data. The size of the device vendor logs 220 may vary depending on the storage device manufacturer. Software with access to the storage device 205 may store data in the device vendor logs 220 in accordance with a command protocol such as the protocol established by the T13 committee. The device vendor logs 220 may be accessible by software code running in the BIOS module 140 and by software code running on the storage device 205.

The update utility 210 provides an improved storage device firmware update. The update utility 210 may store an update for the storage device 205 on the non-volatile storage of the storage device 205. This update may be a delayed update to be executed at a moment subsequent in time to when the update is downloaded, such as on the next boot of the computer system 100 and storage device 205. The update utility 210 may also store an indicator of the update. In one embodiment, the update utility 210 stores the update indicator in the device vendor logs 220. The update indicator indicates to the update apparatus 225 that an update is available. The update indicator may include a bit, a variable, a flag, a signature, and the like. One skilled in the art realizes that an available update may be indicated with various kinds of data representations.

The update utility 210 may execute on the computer system 100 after the computer system 100 and storage device 205 are booted. In one embodiment, the update utility 210 operates in conjunction with a resource manager stored on the storage device 205 and operating on the computer system 100. The resource manager, as used herein, is a manager and coordinator of the activities and resources of the computer system 100 including the storage device 205 and the non-volatile storage media of the storage device 205. The resource manager may include all or portions of an operating system, file system, storage client, and the like. In one embodiment, the resource manager is an operating system and the update utility 210 is a program running on the operating system along with other utilities and applications.

In one embodiment, the update is a firmware update comprising software code to modify the firmware 215 of the storage device 205. The update may also include other software code and files associated with the update such as files for installing and configuring the update. The update may include code for the BIOS module 140 to boot into an interface environment such as a Disk Operating System ("DOS") environment, a Unified Extensible Firmware Interface ("UEFI") bootloader environment, and the like. The update utility 210 may store the update by invoking a storage operation or issuing a command to write the update to the non-volatile storage media or by issuing a command for the storage device 205 to store the update. In one embodiment, the update utility 210 stores the update in one or more of the device vendor logs 220.

The update apparatus 225 detects an available update stored by the update utility on the non-volatile storage media of the storage device 205 and initiates the available update to update the storage device 205. The update apparatus 225, in one embodiment, determines that an update is available during a reboot of the computer system 100 and/or storage device 205 by detecting the presence of the update indicator stored by the update utility 210. The update apparatus 225 may then initiate the update by booting from data in the available update and installing the update. The update apparatus 225 is in communication with the BIOS module 140. The update apparatus 225 may operate as part of or in conjunction with the BIOS module 140. Similarly, while the update apparatus 225 resides in the BIOS module 140 in FIG. 2, the update apparatus 225 may also reside outside of the BIOS module 140.

The update apparatus 225 and the update utility 210 provide a firmware update for a storage device 205 stored on the actual storage device 205 to be updated, eliminating the need for an external disk or a lengthy download over the network. In addition, the update utility 210 can store the update for installation during the next reboot so that the storage device 205 does not need to be placed in a quiesced state to put on hold I/0 operations.

Figure 3:
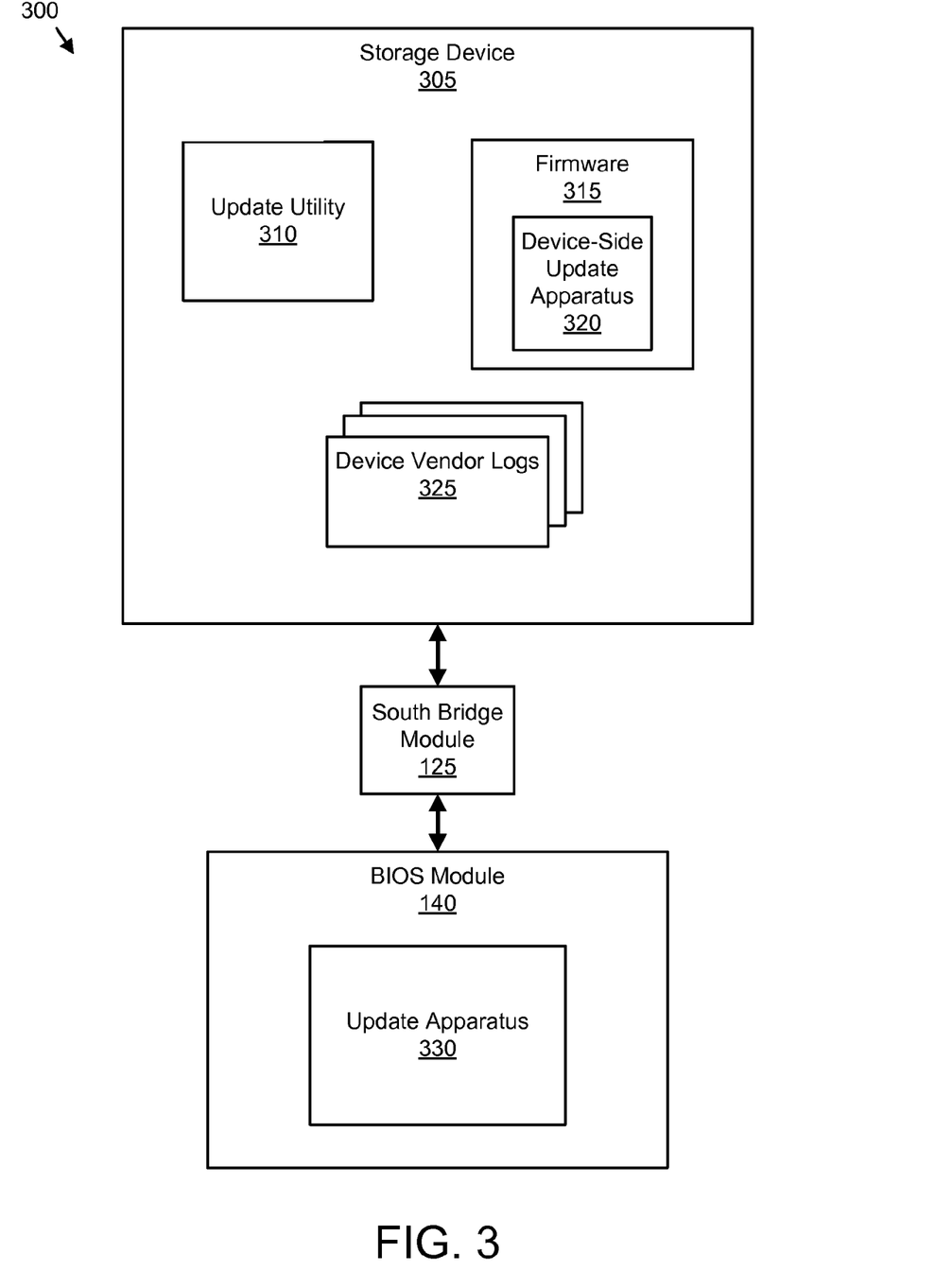
FIG. 3 is a schematic block diagram illustrating another embodiment of a system for updating firmware on a storage device.

FIG. 3 is a schematic block diagram illustrating another embodiment of a system 300 for updating firmware on a storage device 305. The system 300 includes a BIOS module 140, a south bridge module 125, and a storage device 305. The BIOS module 140 and the south bridge module 125 may be similar to the BIOS module 140 and the south bridge module 125 of FIG. 1. Furthermore, the storage device 305 may be the storage module 165 of FIG. 1. The BIOS module 140 includes an update apparatus 330 and the storage device 305 includes an update utility 310, firmware 315 with a device-side update apparatus 320, and device vendor logs 325.

As with the storage device 205 depicted in FIG. 2, the storage device 305 includes non-volatile storage media and may be a hard disk drive, an optical storage device, a holographic storage device, a micromechanical storage device, a solid-state storage device, and the like. In one embodiment, the storage device 305 is a primary storage device of the computer system 100.

In one embodiment, the update utility 310, device vendor logs 325, and firmware 315 are stored on non-volatile storage media of the storage device 305. However, the firmware 315 may be stored in a location separate from the update utility 310 and the device vendor logs 325. The update utility 310, while depicted as residing in the storage device 305, may also reside on another storage device as part of, or in communication with, the computing system 100 and/or storage device 305.

Similar to the firmware 215 depicted in FIG. 2, the firmware 315 comprises embedded code with various components that enable operation of the storage device 305. The firmware 315 may enable basic operation of the storage device 305 and also implement higher-level functions. The firmware 315 includes a device-side update apparatus 320 in communication with the firmware 315 which, while depicted as residing in the firmware 315, may also reside outside of the firmware 315. The device-side update apparatus 320 is discussed in greater detail below.

Similar to the device vendor logs 220 depicted in FIG. 2, the device vendor logs 325 are a portion of the non-volatile storage that reside on the storage device 305 and are separate from the non-volatile storage to which applications, utilities and programs store and access data with standard storage operations. The device vendor logs 325 may be accessible by software code running in the BIOS module 140 and by software code running on the storage device 305.

The update utility 310 provides another embodiment of an improved storage device firmware update. The update utility 310 may store or facilitate the storage of an update for the storage device 305 on the non-volatile storage of the storage device 305. In one embodiment, the update utility 310 sends a command to the storage device 305 to store the update. Specifically, the update utility 310 may send a command to the device-side update apparatus 320 along with the files for the update and the device-side update apparatus 320 may store the update in non-volatile storage media of the storage device 305 in response to the command. In one embodiment, the update utility 310 stores the update in one or more of the device vendor logs 325.

The update may be a delayed update executed at a later time, such as on the next boot of the computer system 100 and/or storage device 305. In one embodiment, the update is a firmware update comprising software code to modify the firmware 315 of the storage device 305. The update may also include other software code and files associated with the update for installing and configuring the update. The update utility 310 may store the update by invoking a storage operation or issuing a command to write the update to the non-volatile storage media or by issuing a command for the storage device 305 to store the update through the device-side update apparatus 320.

The update utility 310 may also store an indicator of the update or facilitate the storing of the indicator. The update indicator indicates to the update apparatus 330 that an update is available. The update indicator may include a bit, a variable, a flag, a signature, and the like. One skilled in the art realizes that an available update may be indicated with various kinds of data representations.

The update utility 310 may execute on the computer system 100 after the computer system 100 and storage device 305 are booted. In one embodiment, the update utility 310 operates in conjunction with a resource manager stored on the storage device and executed on the computer system 100.

The device-side update apparatus 320 works in conjunction with the update utility 310 and the update apparatus 330 to store the update, the update indicator, and to execute the update. In one embodiment, the device-side update apparatus 320 receives a command from the update utility 310 to store the update in non-volatile storage media of the storage device 305 in response to the command. The device-side update apparatus 320 may also receive the update along with the command. The device-side update apparatus 320, in one embodiment, stores the update indicator in response to storing the update. In this embodiment, the device-side update apparatus 320 may automatically store the update indicator in response to the command from the update utility 310 to the store the update and the device-side update apparatus 320 may not require an additional command from the update utility 310 to store the update indicator.

In one embodiment, the device-side update apparatus 320 receives a command from the update apparatus 330 in the BIOS module 140 to execute the update. The device-side update apparatus 320 may execute the update and return an acknowledgement to the update apparatus 330.

The update apparatus 330 detects an available update stored by the update utility 310 and/or the device-side update apparatus 320 and initiates the available update to update the storage device 305. The update apparatus 330, in one embodiment, determines that an update is available during a reboot of the computer system 100 and/or storage device 305 by detecting the presence of the stored update indicator. The update apparatus 330 may then initiate the update by sending a command to the device-side update apparatus 320 to execute the update. After the update is installed, the update apparatus 330 may receive an acknowledgement of the successful update from the device-side update apparatus 320.

The update apparatus 330 is in communication with the BIOS module 140. The update apparatus 330 may operate as part of or in conjunction with the BIOS module 140. Similarly, while the update apparatus 330 resides in the BIOS module 140 in FIG. 3, the update apparatus 330 may also reside outside of the BIOS module 140.

The update apparatus 330, the device-side update apparatus 320, and the update utility 310 provide a firmware update for a storage device 305 stored on the actual storage device 305 to be updated, eliminating the need for an external disk or a lengthy download over the network. In addition, the device-side update apparatus 320 can store the update for installation during the next reboot so that the storage device 305 does not need to be placed in a quiesced state that holds I/O operations.

Figure 4:
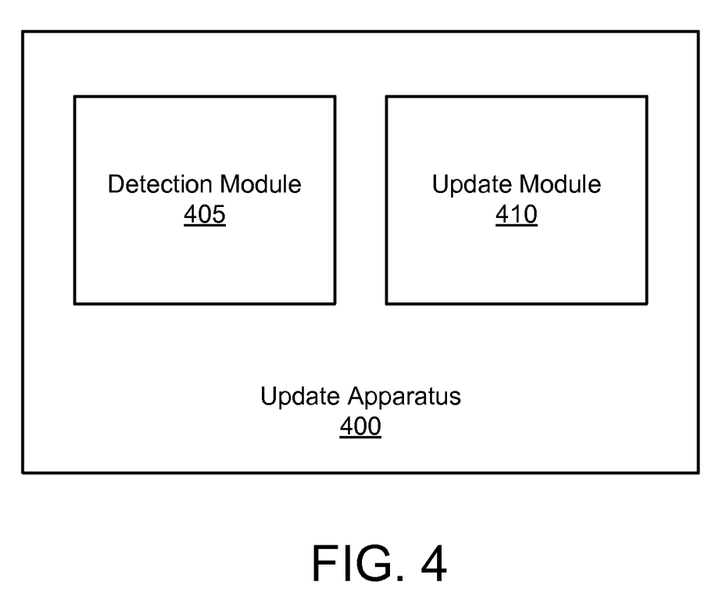
FIG. 4 is a schematic block diagram illustrating one embodiment of an update apparatus.

FIG. 4 is a schematic block diagram illustrating one embodiment of an update apparatus 400. The update apparatus 400 may be the update apparatus 225 depicted in FIG. 2 or the update apparatus 330 depicted in FIG. 3. The description of the update apparatus 400 refers to elements of FIGS. 1, 2 and 3, like numbers referring to like elements. The update apparatus 400 includes a detection module 405 and an update module 410.

The detection module 405 determines if an update for a storage device 205, 305 is available during a boot sequence. The boot sequence may be the boot sequence of a computer system 100 and/or a storage device 205, 305. The boot sequence may include the start-up sequence of the computer system 100 and/or storage device 205, 305 in which the BIOS module 140 initializes the computer system 100 and/or storage device 205, 305 so that computer readable software instructions stored on the storage device 205, 305 can load, execute, and assume control of the computer system 100.

In one embodiment, the detection module 405 detects, during a boot sequence, an indicator of an available update. The indicator may be stored on the non-volatile storage media of the storage device 205, 305 and the detection module 405 may check a specific location on the non-volatile storage media for the indicator. In one embodiment, the indicator is stored in the device vendor logs 220, 325. In another embodiment, the indicator is stored as a bit or identifier in the device identification information of the storage device 305. The device identification information is maintained by the storage device 305 itself and is designed to communicate to the information about the storage device 305 such as model number, serial number, firmware level, supported transfer speeds, status on features, and the like.

The indicator may indicate that an available update is stored on the storage device 205, 305 and may also indicate the location of the available update. For example, the indicator may be stored in the device vendor logs 220, 325 and indicate a specific Logical Block Address range storing the available update.

In one embodiment, the indicator is stored on the non-volatile storage media of the storage device 205, 305 by a utility operating in conjunction with the resource manager managing the non-volatile storage media of the storage device 205, 305. For example, the indicator may be stored by a utility operating on the operating system of the computing system 100. In another embodiment, the indicator is stored by the storage device 305 itself by, for example, code in the firmware 315 of the storage device 305 in response to a command from a utility.

In one embodiment, the available update is stored on non-volatile storage media of the storage device 205, 305. In a further embodiment, the available update is stored outside the range of Logical Block Addresses available for standard storage operations of applications, programs, and utilities running on the computer system 100. In one embodiment, the available update is stored on one or more device vendor logs 220, 325 residing on the storage device 205, 305. In another embodiment, the available update is stored in the standard range of Logical Block Addresses available for storage in the computing system 100. In this embodiment, the Logical Block Address range storing the available update may be indicated in the device vendor logs 220, 325. In one embodiment, the available update is stored on the non-volatile storage media of the storage device 205, 305 by a utility operating in conjunction with the resource manager managing the non-volatile storage media of the storage device 205, 305. For example, the available update may be stored by a utility operating on the operating system of the computing system 100. In another embodiment, the available update is stored by the storage device 305 itself by, for example, code in the firmware 315 of the storage device 305 in response to a command from a utility.

The available update may be an update for the storage device 205, 305 and may include an update for firmware 215, 315 running on the storage device 205, 305. In addition, the available update may be an update for other programs, applications, utilities, or software code running or stored on the storage device 205, 305 and/or computer system 100. The available update may include the actual code to install the update such as a binary ("BIN") file. As stated above, the update may also include other software code and files associated with the update for installing and configuring the update. The update may include code to for the BIOS module 140 to boot into an interface environment such as a Disk Operating System ("DOS") environment, a Unified Extensible Firmware Interface ("UEFI") bootloader environment, and the like.

In one embodiment, the detection module 405 validates the available update. Validating the available update may include determining if the available update is authentic, ensuring that it is stored in the location indicated by the update indicator, ensuring that the version number of the update is applicable to version number of the current firmware 215, 315 of the storage device 205, 305, and the like.

In an alternate embodiment, the detection module 405 detects, during a boot sequence, an indicator of a program, application, or boot environment not including an update. For example, the detection module 405 may detect an indicator of a stored interface environment such as DOS or UEFI and a user may then perform maintenance on the storage device 205, 305 and/or computing system 100 from the booted environment.

The update module 410 updates the storage device 205, 305 with the available update in response to the detection module 405 detecting the indicator of the available update. In one embodiment, the update module 410 updates the storage device 205 by booting from data in the available update and installing the update. Data in the available update may include BIN files, interface environments, installation files, and the like. In one embodiment, the update module 410 reads one or more files of the available update into memory and boots to the one or more files using the data from the available update as a virtual drive. The update module 410, after completing the update, may also remove or delete the indicator from the non-volatile storage media.

In another embodiment, the update module 410 updates the storage device 305 by sending a command to the storage device 305 which then executes the update on the storage device 305. In one embodiment, after the storage device 305 executes the update, the storage device 305 returns an acknowledgment of a successful update and the BIOS module 140 may continue booting the computing system 100.

Figure 5:
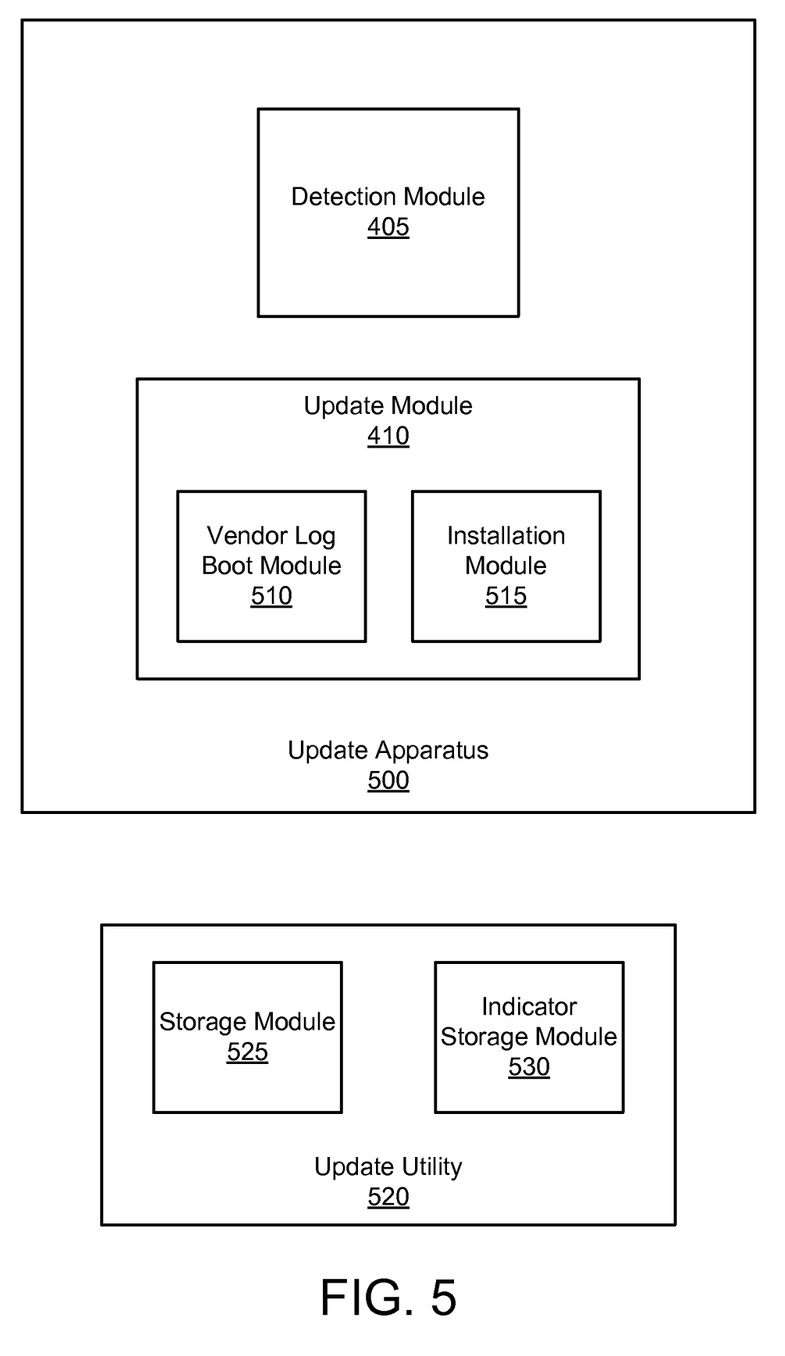
FIG. 5 is a detailed schematic block diagram illustrating another embodiment of an update apparatus.

FIG. 5 is a detailed schematic block diagram illustrating another embodiment of an update apparatus 500 with an update utility. The update apparatus 400 may be the update apparatus depicted in FIG. 2. The description of the update apparatus 500 refers to elements of FIGS. 1, 2, and 4 like numbers referring to like elements. The update apparatus 500 includes the detection module 405 and the update module 410 wherein these modules include substantially the same features as described in relation to FIG. 4. In addition, the update module 410 includes a vendor log boot module 510 and an installation module 515. The update utility 520 includes a storage module 525 and an indicator storage module 530.

The vendor log boot module 510 boots the storage device 205 from data in the available update. As stated above, data in the available update may include BIN files, interface environments, installation files, and the like. In one embodiment, the vendor log boot module 510 reads one or more files of the available update into memory and boots to the one or more files using the data from the available update as a virtual drive.

The installation module 515 installs the available update on the storage device 205. In one embodiment, the installation module 515 installs the available update from the device vendor logs 220 and the information stored in the device vendor logs 220 associated with the update.

The storage module 525 stores the available update on the non-volatile storage media. In one embodiment, the storage module 525 stores the available update in one or more device vendor logs 220. The storage module 525 may detect a potential firmware update automatically or in response to user input. For example, the storage module 525 may receive notification of a potential firmware update over a network and store the potential firmware update as an available update in response to the notification.

Figure 6:
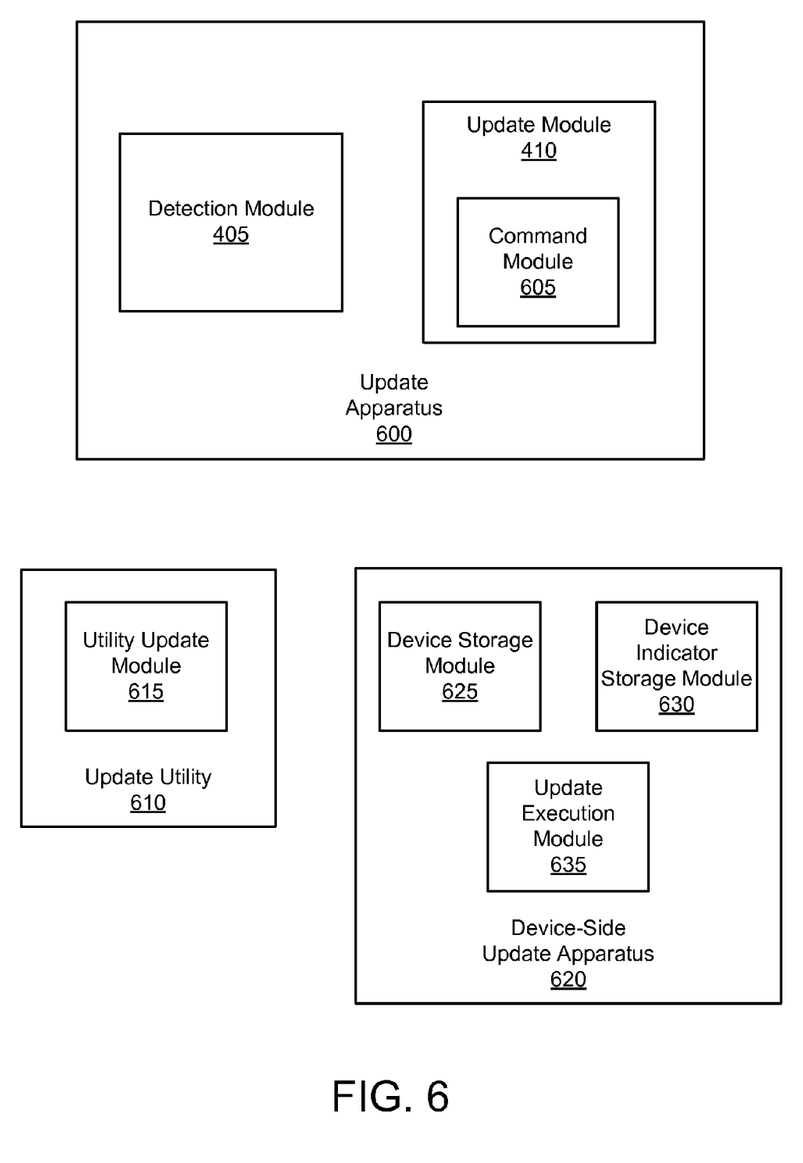
FIG. 6 is a detailed schematic block diagram illustrating yet another embodiment of an update apparatus.

FIG. 6 is a detailed schematic block diagram illustrating yet another embodiment of an update apparatus 600 with an update utility 610 and a device-side update apparatus 620. The update apparatus 600 may be the update apparatus 330 depicted in FIG. 3. The description of the update apparatus 600 refers to elements of FIGS. 1, 3, and 4, like numbers referring to like elements. The update apparatus 600 includes the detection module 405 and the update module 410 wherein these modules include substantially the same features as described in relation to FIG. 4. In addition, the update module 410 includes a command module 605, the update utility 610 includes a utility update module 410, and the device-side update apparatus 620 includes a device storage module 625, a device indicator storage module 630, and an update execution module 635.

The command module 605 issues an update command to the storage device 305 to notify the storage device to execute the update. The storage device 305 may then execute the update on the storage device 305 in response to the update command.

Specifically, the update execution module 635 executes the available update on the storage device 305 in response to the update command from the command module 605. In one embodiment, after the update execution module 635 executes the update, the storage device 305 returns an acknowledgment of a successful update and the BIOS module 140 may continue booting the computing system 100.

The utility update module 615 issues a command to the storage device 305 to store the available update on the non-volatile storage media. In response to the command, the device storage module 625 stores the available update on the non-volatile storage media of the storage device 305. The device storage module 625 may store the available update in the device vendor logs 325 or in another location on the non-volatile storage media. In one embodiment, the command comprises a modified "DOWNLOAD MICROCODE" ATA command from the T13 specification. DOWNLOAD MICROCODE is a command currently used to update firmware on a Serial-ATA storage device for immediate update to the device. One embodiment would be to modify this command to queue the firmware 305 for future update instead of for immediate update. Beneficially, a future update allows for better operation of the storage device 305 because many operating system environments will not function properly if the storage device 305 is reset with a new firmware 315 while the operating system is active.

The device indicator storage module 630 stores the indicator to indicate an available update. In one embodiment, the device indicator storage module 630 stores the indicator in device identification information maintained by the storage device 305. In one embodiment, the device indicator storage module 630 stores the indicator automatically in response to the device storage module 625 storing the available update. In another embodiment, the device indicator storage module 625 stores the indicator in response to a command from the utility update module 615.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
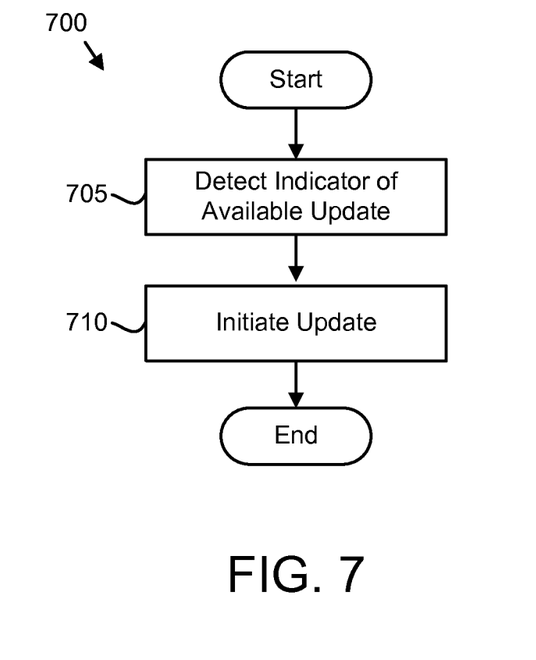
FIG. 7 is a schematic flow chart diagram illustrating one embodiment of a method for updating firmware on a storage device.

FIG. 7 is a schematic flow chart diagram illustrating one embodiment of a method 700 for updating firmware on a storage device 205, 305. The method 700 substantially includes the steps to carry out the functions presented above with respect to the operation of the described apparatus and system of FIGS. 1 and 2-4. The description of the method 700 refers to elements of FIGS. 1 and 2-4, like numbers referring to like elements.

In one embodiment, the method 700 is implemented with a computer readable storage medium comprising a computer readable program stored on a tangible memory device. The computer readable storage medium may be integrated into a computing system, such as the computing system 100, wherein the computer readable program executed by the processor 105 performs the method 700.

The method 700 starts and the detection module 405 detects 705, during a boot sequence, an indicator of an available update of firmware controlling a storage device 205, 305. The available update is stored on non-volatile storage media of the storage device 205, 305. Next, the update module 410 updates the storage device 205, 305 with the available update in response to the detection module 405 detecting the indicator of the available update. Then, the method 700 ends.

Figure 8:
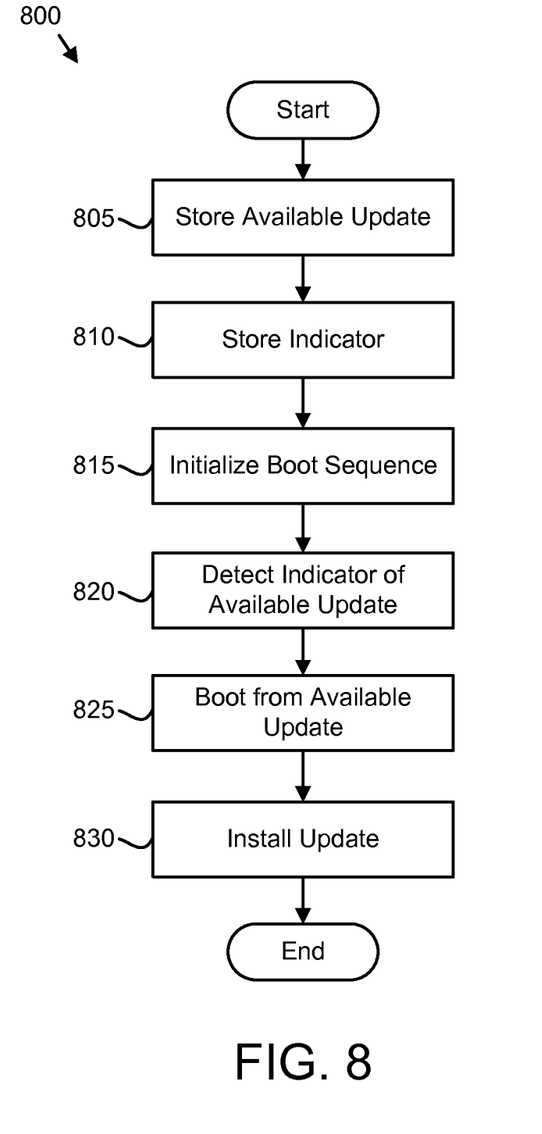
FIG. 8 is a detailed schematic flow chart diagram illustrating another embodiment of a method for updating firmware on a storage device.

FIG. 8 is a detailed schematic flow chart diagram illustrating another embodiment of a method 800 for updating firmware on a storage device 205. The method 800 substantially includes the steps to carry out the functions presented above with respect to the operation of the described apparatus and system of FIGS. 1, 2, 4, and 5. The description of the method 700 refers to elements of FIGS. 1, 2, 4, and 5, like numbers referring to like elements.

In one embodiment, the method 800 is implemented with a computer readable storage medium comprising a computer readable program stored on a tangible memory device. The computer readable storage medium may be integrated into a computer system, such as the computing system 100, wherein the computer readable program executed by the processor 105 performs the method 800.

The method 800 starts and the storage module 525 stores 805 an available update in one or more device vendor logs 220 on non-volatile storage media of a storage device 205. The update stored in the device vendor logs 220 may contain bootable system code, executable firmware update code or system utilities in addition to the storage device firmware update. The indicator storage module 530 stores 810 an indicator in the one or more device vendor logs 220 on the storage device 205. The indicator indicates an available update of the firmware controlling the storage device 205. At the next reboot, the BIOS module 140 initializes 815 the boot sequence of the storage device 205 and/or the computing system 100 which is in communication with the storage device 205.

The detection module 405 then detects 820, during the boot sequence, the indicator of the available update of firmware. The vendor log boot module 510 boots 825 the storage device 205 from data in the available update and the installation module installs 830 the available update on the storage device 205 from the device vendor logs 220. Then, the method 800 ends.

Figure 9:
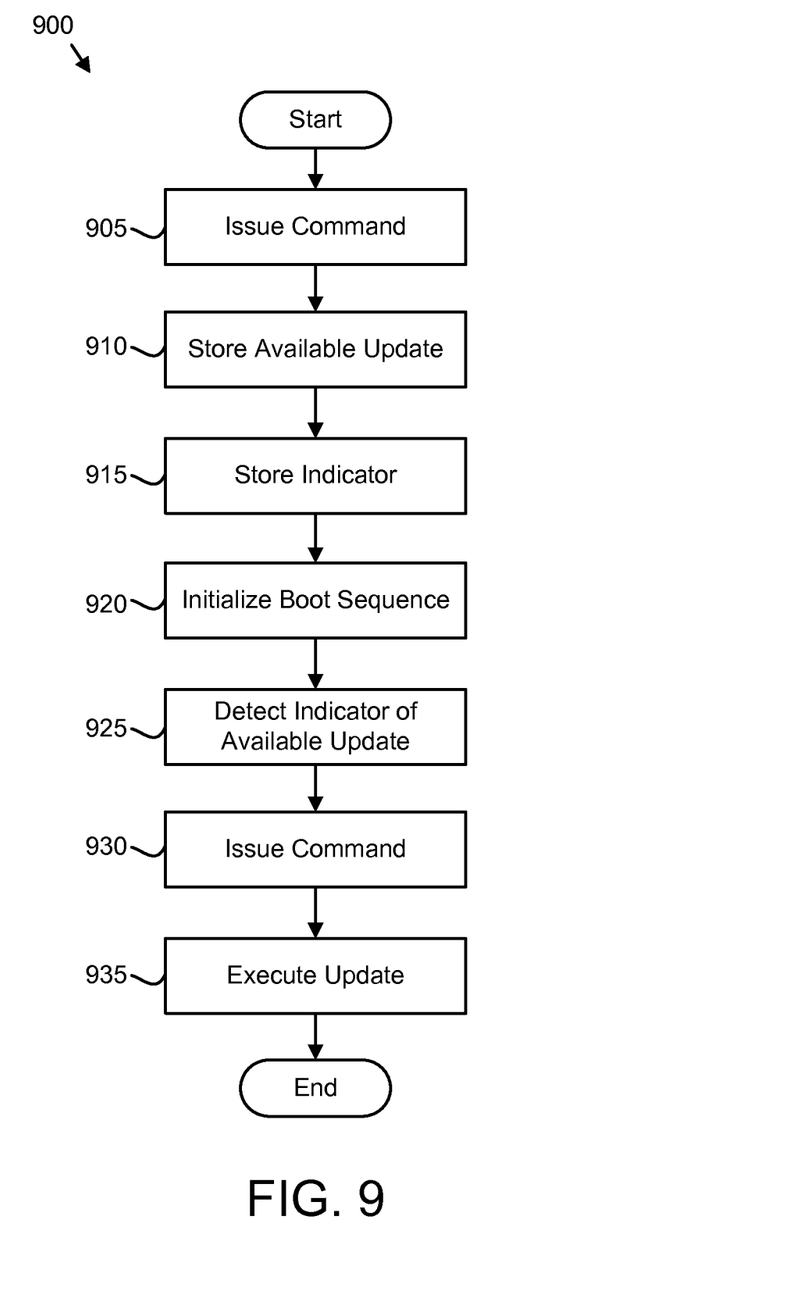
FIG. 9 is a detailed schematic flow chart diagram illustrating yet another embodiment of a method for updating firmware on a storage device.

FIG. 9 is a detailed schematic flow chart diagram illustrating yet another embodiment of a method 900 for updating firmware on a storage device 305. The method 900 substantially includes the steps to carry out the functions presented above with respect to the operation of the described apparatus and system of FIGS. 1, 3, 4, and 6. The description of the method 900 refers to elements of FIGS. 1, 3, 4, and 6, like numbers referring to like elements.

In one embodiment, the method 900 is implemented with a computer readable storage medium comprising a computer readable program stored on a tangible memory device. The computer readable storage medium may be integrated into a computer system, such as the computing system 100, wherein the computer readable program executed by the processor 105 performs the method 900.

The method 900 starts and the utility update module 615 issues 905 a command to the device storage module 625 to store the available update on the non-volatile storage media of the storage device 305. Next, the device storage module 625 stores 910 the available update on the non-volatile storage media of the storage device 305 in response to the command. The device indicator storage module 630 stores 915 the indicator in device identification information maintained by the storage device 305. At the next reboot, the BIOS module 140 initializes 920 the boot sequence of the storage device 305 and/or the computing system 100 which is in communication with the storage device 305.

The detection module 405 then detects 925, during the boot sequence, the indicator of the available update of firmware. The command module 605 issues 930 an update command to the update execution module 635 in response to the detection module 405 detecting the indicator of the available update. Next, the update execution module 635 executes 935 the available update on the storage device 305 in response to the update command. Then, the method 900 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method executable by a processor comprising:
  issuing a command to store an available update, the available update comprising:
    firmware for controlling storage devices on a storage device; and
    executable code apart from the firmware for booting into an UEFI environment;
  storing the available update on non-volatile storage media of the storage device at a range of location block addresses available for standard write operations by applications in response to the command;
  storing an indicator specifying the range of location block addresses of the available update in a device vendor log in response to the storage module storing the available update by way of a utility operating through a resource manager managing the non-volatile storage media of the storage device;
  detecting, during a boot sequence, the indicator of the available update and an indicator of an UEFI environment and
  updating the storage device with the available update in response to detecting the indicator of the available update, wherein updating the storage device comprises:
    booting the storage device from the available update at the specified range of location block addresses on the non-volatile media; and
    installing the available update on the storage device.

2. The method of claim 1, wherein updating the storage device further comprises issuing an update command to the storage device and executing the available update on the storage device in response to the update command.

3. A computer program product comprising a non-transitory computer readable storage medium storing computer usable program code executable to perform operations comprising:
  issuing a command to store an available update, the available update comprising:
    firmware for controlling storage devices on a storage device; and
    executable code apart from the firmware for booting into an UEFI environment;
  storing the available update on non-volatile storage media of the storage device at a range of location block addresses available for standard write operations by applications in response to the command;
  storing an indicator specifying the range of location block addresses of the available update in a device vendor log in response to the storage module storing the available update by way of a utility operating through a resource manager managing the non-volatile storage media of the storage device;
  detecting, during a boot sequence, the indicator of the available update and an indicator of an UEFI environment and
  updating the storage device with the available update in response to detecting the indicator of the available update, wherein updating the storage device comprises:
    booting the storage device from the available update at the specified range of location block addresses on the non-volatile media; and
    installing the available update on the storage device.

4. The computer program product of claim 3, wherein updating the storage device further comprises issuing an update command to the storage device, the storage device executing the available update on the storage device in response to the update command.

5. An apparatus having a processor comprising:
  a utility update module issuing a command to store an available update, the available update comprising:
    firmware for controlling storage devices on a storage device; and
    executable code apart from the firmware for booting into an Unified Extensible Firmware Interface (UEFI) environment;
  a storage module, in response to the command, storing the available update on non-volatile storage media of the storage device at a range of location block addresses available for standard write operations by applications;
  an indicator storage module storing an indicator specifying the range of location block addresses of the available update in a device vendor log in response to the storage module storing the available update;
  a detection module detecting, during a boot sequence, the indicator of the available update and an indicator of an UEFI environment; and an update module updating the storage device with the available update in response to the detection module detecting the indicator of the available update, the update module comprising;
   a boot module booting the storage device from the available update at the specified range of location block addresses on the non-volatile media; and
   an installation module installing the available update on the storage device.

6. The apparatus of claim 5, wherein the update module further comprises a command module issuing an update command to the storage device.

7. The apparatus of claim 6, further comprising an update execution module executing the available update on the storage device in response to the update command.

* * * * *